(12) United States Patent
Endoh et al.

(10) Patent No.: US 7,141,086 B2
(45) Date of Patent: Nov. 28, 2006

(54) ABRASIVE GRAIN AND METHOD FOR PRODUCING IT, POLISHING TOOL AND METHOD FOR PRODUCING IT, GRINDING WHEEL AND METHOD FOR PRODUCING IT, AND POLISHING APPARATUS

(75) Inventors: Hiroyuki Endoh, Tokyo (JP); Jun Zhang, Tokyo (JP); Toshiyuki Enomoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 10/452,380

(22) Filed: Jun. 3, 2003

(65) Prior Publication Data

US 2004/0040216 A1 Mar. 4, 2004

(30) Foreign Application Priority Data

Jun. 3, 2002 (JP) ............... 2002-161393

(51) Int. Cl.
*C09K 3/14* (2006.01)
*B24D 3/00* (2006.01)
*B24D 5/00* (2006.01)
*B24D 7/00* (2006.01)
*B24D 11/00* (2006.01)

(52) U.S. Cl. ............... 51/307; 51/308; 51/309
(58) Field of Classification Search ............ 51/307, 51/309, 308
See application file for complete search history.

(56) References Cited

U.S. PATENT DOCUMENTS

| 6,053,956 A | * | 4/2000 | Wood | 51/309 |
| 6,334,880 B1 | * | 1/2002 | Negrych et al. | 51/308 |
| 2004/0198584 A1 | * | 10/2004 | Wang | 501/127 |

FOREIGN PATENT DOCUMENTS

| JP | 7-164324 | 6/1995 |
| JP | 8-155840 | 6/1996 |
| JP | 9-504235 | 4/1997 |
| JP | 2000-176842 | 6/2000 |
| JP | 2000-198073 | 7/2000 |
| JP | 2000-237962 | 9/2000 |
| JP | 2001-129764 | 5/2001 |

OTHER PUBLICATIONS

U.S. Appl. No. 10/452,380, filed Jun. 3, 2003, Endoh et al.
U.S. Appl. No. 11/331,166, filed Jan. 13, 2006, Zhang.

\* cited by examiner

*Primary Examiner*—Michael Marcheschi
(74) *Attorney, Agent, or Firm*—Oblon, Spivak, McClelland, Maier & Neustadt, P.C.

(57) ABSTRACT

An abrasive grain including a porous particle material in which a large number of fine particles for cutting edges form gaps partly among them and bond loosely each other. The particles for the cutting edges are produced by growing primary particles in secondary particles, which are formed by cohesion of a large number of primary particles, with a heat treatment at a temperature of forming necks at bonding points among the primary particles.

8 Claims, 8 Drawing Sheets

DISPLACEMENT OF PRESSURE($\mu$m)

0.6 μm 50.0 μm/DIV

LENGTH OF MEASUREMENT (mm)

LENGTH OF MEASUREMENT (mm)

LENGTH OF MEASUREMENT (mm)

LENGTH OF MEASUREMENT (mm)

ABRASIVE GRAIN AND METHOD FOR
PRODUCING IT, POLISHING TOOL AND
METHOD FOR PRODUCING IT, GRINDING
WHEEL AND METHOD FOR PRODUCING
IT, AND POLISHING APPARATUS

BACKGROUND OF THE INVENTION

1. Field of the Invention

The present invention relates to an abrasive grain to carry out finish machining of hard and fragile materials, such as silicon, glass and so on, and a metal material, for example, steel, aluminum and so on, and further to a method for producing the abrasive grain, a polishing tool composing of the abrasive grain and having a long operation life, a polishing apparatus which has the polishing tool and a method for producing the polishing tool, which contributes to a high quality and a high efficiency of a processing.

2. Description of the Prior Art

For a final finishing of a part, which is made of a silicon wafer, a glass disk, various hard and fragile materials, or metal materials, a polishing process using a loose-abrasive slurry has been widely adopted because this process is easy to use a fine abrasive grain so that a fine finishing surface can be obtained easily. Moreover, a large amount of abrasive slurry can also maintain stable processing characteristics of the final finishing by means of a stable supplying of the slurry.

However, this polishing processing, which uses the abrasive slurry, requires a large amount of slurry, and discharges a waste of the large amount of slurry, so that it has a great impact on environment conservation.

This polishing processing has also a limit for increasing a processing efficiency. Under such circumstances, a development of a fixed-abrasive processing tool, which can produce an excellent finishing surface more than the similar to that obtained by using the loose-abrasive slurry, is actively carried out in various fields.

For a finishing process with abrasive grain, it is an advantageous to use a fine abrasive grain in order to produce an excellent surface roughness, which is also normally true for the fixed-abrasive processing tool.

However, in order to produce an excellent surface such as a mirror surface, a contact between a bonding material bonding the abrasive grain and a backing and a work piece is caused by using the fixed-abrasive processing tool in which a particle diameter is less than several μm, and also chips of the bonding material and the abrasive grains are accumulated among the abrasives grains, and then clogging of the abrasive grains are caused.

As a result, not only the removal rate would be decreased, but also the surface quality would be damaged, and in a worst case, it is not possible to carry out the finishing process of the work piece by the abrasive grains.

Moreover, even though a method for controlling the contact between the bonding material of abrasive grains and the work piece is taken, there is a problem for declining processing efficiency because a diameter of each of the abrasive grains is small.

On the other hand, when an abrasive grain in which a diameter of a particle is large is selected to use, it is possible to improve the processing efficiency, but the quality of the surface is deteriorated, and it tends to be difficult to produce the mirror surface.

In order to solve these problems, the abrasive grain is powdered and then the powder is agglomerated and the fixed-abrasive processing tool, which uses the agglomerated powder as the abrasive grain is proposed. (References: Japanese Patent Laid-Open Hei7-164324, Hei8-155840, 2000-198073, 2000-237962, 2000-176842, and 2001-129764, Japanese Patent publication Hei9-504235)

For this fixed-abrasive grain processing tool, the excellent surface roughness is provided by an action of the fine abrasive grain, and at the same time, an improvement of the processing efficiency by the agglomerated abrasive grain can be accomplished.

However, it is still required that further improvements in the processing efficiency and the processing life should be achieved. Moreover, these proposed technologies do not focus on a bonding strength among the fine particles comprising the abrasive grain, so that requirements of improving the processing efficiency can hardly be met.

SUMMARY OF THE INVENTION

An object of the present invention is to solve problems of said prior art. In other words, the object of the present invention is to provide an abrasive grain, which can maintain an extremely high processing efficiency for a long processing time without loosing a surface roughness, a long operating life of a polishing tool and a polishing apparatus, which uses the abrasive grain.

According to a result based on the inventor's repeated careful research about a fixed-abrasive processing tool, which uses agglomerated powder of a fine abrasive grain as the abrasive grain after granulating the fine abrasive grain related to said prior art, it has been proved that basically, a bonding strength among particles comprising the abrasive grain is very important factor although it is influenced by a work piece.

In the prior art, the bonding strength among the particles composing the agglomerated abrasive grain has not been noted and studied at all.

During grinding or polishing process, the abrasive grain is worn away gradually and the top of it becomes flat. The flat or planarized surface of the abrasive grain or a substantially planarized surface acts as a polishing surface or a cutting edge of the work piece.

A high polishing efficiency is achieved when using the abrasive grain consisting of sintered ceramic. However, this abrasive grain is too hard to use because it does not have gaps inside. As a result, big scratch is newly generated on a surface of a work piece by the processing, and then the surface roughness is deteriorated.

On the other hand, when using the abrasive grain consisting of secondary particles, which are formed by cohesion or agglomeration of fine primary particles, a high polishing quality is achieved because a sort of cutting edges are formed by the primary particles and the gaps. The cutting edges are composed of particles acting to polish a work piece.

However, this abrasive grain consisting of the secondary particles, which are formed by the cohesion of fine primary particles, can not be achieved to the high polishing efficiency if the bond among the primary particles are not controlled. This abrasive grain also can not be achieved to a practical use of durability and an operating life.

At this point, the present inventors found out that in the abrasive grain, which is formed by gathering the fine particles, it is possible for the abrasive grain to wear away gradually by controlling the bonding strength among the fine particles.

According to this abrasive grain, new cutting edges are generated consistently, and it is possible to maintain the high processing efficiency for the work piece and an excellent processing characteristic, which can produce a high quality of a surface corresponding to nanometer, for a long processing time. As a result, the wear of the abrasive grain itself is also controlled, and the tool can be used longer.

In other words, characteristics of the abrasive grain related to the present invention consist of a porous particle material. The porous material consists of a large number of fine particles for the cutting edges, which contain gaps between primary particles bonded to each other. A large number of the fine particles for cutting edges are produced by growing the primary particles into secondary particles, which are formed by the cohesion of a large number of the primary particles via heat treatment at a temperature sufficient to form necks at bonding points among the primary particles.

According to this abrasive grain, when the abrasive grain is actually used, at least one part, which is adjacent to the gaps between the particles acts as the grinding surface. New surfaces for the grinding are projected on the processing surface while the parts making the original grinding surfaces are lost by the wear.

Consequently, when the polishing and grinding processing are conducted the cutting edges are always generated voluntarily on the abrasive grain, and it makes easy to eliminate wastes of the polishing and the grinding and maintains the excellent quality effectively. Therefore, it is possible to have stable processing for the long processing time.

It is desirable that strength of compression failure for the abrasive grain is more than 1 MPa and less than 500 MPa.

If the strength of compression failure for the abrasive grain exceeds 500 MPa, scratches tend to be generated easily on the processing surface so that a possibility of lowering the quality of the processing surface becomes higher. On the other hand, if the strength of compression failure for the abrasive grain is lower than 1 MPa, there is a possibility that a pre-finished surface of work piece cannot be eliminated completely. In other words, the abrasive grain might not be durable enough to accomplish polishing. Because the bonding strength of the particles for the cutting edges are too weak, so that the polishing and the grinding processing cannot be operated sufficiently, and hard wear is caused, then the processing efficiency declines. Moreover, a grinding burn tends to be generated easily when it is applied to a grinding wheel.

At this point, the grinding burn is generated by a contact between a bond to fix the abrasive grain and the work piece because the grinding wheel does not have the projections required of the abrasive grain. Moreover, a tarnish of the polishing surface is generated since the polishing processing of grinding is not operated normally, and the temperature of the polishing surface goes up.

Accordingly, the wear of the abrasive grain itself and the degree of the fallout, which is generated with losing the part comprising the cutting edges due to the wear of the particles for the cutting edges are optimized so that fine surface quality can be maintained with processing very effectively.

At the same time, the wear of abrasive grain can be controlled, so it is possible for the abrasive grain to keep a good balance between processing efficiency, the processing quality, and the longer operating life. Therefore, it is possible for the polishing tool, which has the abrasive grain, to have the long operating life.

It is more desirable that the strength of compression failure for the abrasive grain is more than 20 MPa and less than 300 MPa.

By using this abrasive grain, it is possible to conduct the processing further effectively with maintaining the higher quality of the processing surface. It is also possible to control the wear abrasion of abrasive grain effectively, and have longer operating life for the polishing tool having the abrasive grain.

It is desirable that a pores specific surface area of the abrasive grain is more than 18000 $cm^2/cm^3$ and less than 700000 $cm^2/cm^3$.

If the pores specific surface area is less than 18000 $cm^2/cm^3$, the scratch of the processing surface tends to be generated easily so that the possibility of deteriorating the surface quality of surface becomes higher.

On the other hand, if the pores specific surface area is bigger than 700000 $cm^2/cm^3$, since the bonding strength among the particles for the cutting edges is too weak, the polishing and the grinding processing cannot be operated sufficiently. As a result, it has a possibility that the pre-finished surface of work piece cannot be eliminated completely because hard wear of the abrasive grain itself is caused, and the processing efficiency extremely declines. Moreover, the grinding burn tends to be generated easily when the area is applied to the grinding wheel.

Accordingly, the wear of the abrasive grain itself and the degree of the fallout, generated by losing the part comprising the cutting edges (grinding surface) due to the wear of the particles for the cutting edges (grinding surface), are optimized to maintain the fine surface quality with processing very effectively, and at the same time, the wear of abrasive grain can be controlled. Therefore, it is possible for the abrasive grain to keep a good balance between processing efficiency, the processing quality, and long operating life. It can make the polishing tool comprising this abrasive grain operate longer.

It is more desirable that the pores specific surface area is more than 100000 $cm^2/cm^3$ and less than 300000 $cm^2/cm^3$.

By using this abrasive grain, it is possible to conduct the processing further effectively with maintaining the high quality of the processing surface. At the same time, the polishing tool, which has this abrasive grain, can be operated longer by controlling the wear of the abrasive grain effectively.

Moreover, it is desirable that an average particle diameter of the particles for the cutting edges of the abrasive grain should be smaller than 5 μm.

If the average diameter of the particles for the cutting edges of the abrasive grain exceeds 5 μm, the scratch is generated on the processing surface, and quality of the processing tends to be declined. It is an undesirable situation. In order to make the average diameter of the articles for the cutting edges less than 5 μm, control of the heat treatment condition can be used to regulate the bonding process.

By using this abrasive grain, the excellent quality of surface is definitely received.

Moreover, if a binder, which bonds the particles for the cutting edges to the abrasive grain, is not used, new particles for the cutting edges are projected automatically when losing the part making the cutting edges (grinding surface) by the wear. Accordingly, insufficiency in the grinding surface due to the presence of a binder on the new cutting edges can be prevented.

Problems for the processing quality such as crushing, clogging, residue of the binder, generation of the scratch by attaching the waste of the polishing to the binder, and so on can be avoided.

This excellent abrasive grain can be produced by means of following a producing method according to the present invention.

Consequently, the present invention of the producing method for the abrasive grain comprises a process for producing the secondary particles by cohesion of a large number of the primary particles, and a process for producing the abrasive grain consisting of the porous particle material in which the particles for the cutting edges are produced by growing the primary particles with heat treatment at the temperature sufficient to form necks at the bonding points between primary particles. Thus, the primary particles are made into secondary particles.

According to this present invention of producing method for the abrasive grain, when the produced abrasive grain is used actually, the part adjacent to the gaps between the particles acts as the grinding surface, and new particles for the cutting edges are projected on the processing surface automatically while the part making the cutting edges is lost by the wear of the particles.

Therefore, by using the produced abrasive grain, when polishing and grinding processing, the cutting edges (grinding surfaces) are always produced automatically for the abrasive grain, improving efficiency and quality. Moreover it is possible to have stable processing for the long processing time.

It is desirable for the heat treatment of this producing method to be operated under the requirement that the average diameter of the particles for the cutting edges, which are formed by this method, is smaller than 5 μm.

If the average diameter of the particles for the cutting edges exceeds 5 μm, an undesirable scratch may be generated on the processing surface, and the processing quality tends to be deteriorated. If the polishing grinding tool is produced by use of this abrasive grain, it is possible to maintain excellent quality and have stable and effective processing for a long processing time.

It is desirable for the polishing tool that the abrasive grain is exposed on a surface of the polishing tool.

Use of this polishing tool can prevent a deterioration of the processing quality occuring between the abrasive grains or between the abrasive grain and binder, which fixes the abrasive grain and bonds the backing.

At this point, more than one kind of material, such as, for example, resin, ceramic, and metals can be chosen to use as the binder. Moreover, for example, it is possible to use a ceramic precursor to produce ceramic after the heat treatment.

The polishing tool can be also selected from a lapping film, a polishing pad grinding cloth, and a grinding wheel.

By using a lapping film, the polishing pad, and the grinding wheel for grinding, it is possible to bring out effects, which provide the high processing quality.

When the lapping film is produced in accordance with the producing method of this invention, the effects of abrasive grain can be achieved, and at the same time, the lapping film can be produced with a low cost. In other words, it is possible for the polishing tool to process polishing with the relatively low cost even though the condition of the polishing tool is disposable or similar to disposable.

When producing the polishing pad in accordance with this invention, the effects of the abrasive grain can be achieved sufficiently, and at the same time, it is possible to use the polishing pad instead of using a surface platen for a traditional polishing apparatus and a lapping machine as the polishing tool. Moreover, unlike a lapping film, it is possible for the polishing pad to be used for the long processing time since new abrasive grain is generated on the surface of the polishing pad after being conditioned.

Therefore, it is possible for the work piece to be finished with the excellent quality of the surface effectively. Moreover, the long operating life of this polishing tool contributes to lower tool cost and a reduction in effort a task to change the polishing tool for workers.

Moreover, by adding the abrasive grain of this invention into the grinding wheel it is possible for the work piece to be finished with the stable excellent surface quality without generating grinding burn at the time of the polishing and grinding processing.

When producing the lapping film in accordance with the producing method of this invention, it is desirable that a thickness of the binder, which fixes the abrasive grain on a backing film, is smaller than a maximum diameter of the abrasive grain.

By using this lapping film, the deterioration of polishing quality, which is caused by a contact of the binder to the polishing surface, can be prevented, and at least the minimum amount of the projection of the abrasive grain is guaranteed.

It is also desirable that a content ratio of the abrasive grain at a part comprising the abrasive grain of the polishing tool is more than 5 percent in volume and less than 90 percent in volume.

If the content ratio of the abrasive grain is less than 5 percent in volume, it has a possibility that an the abrasive grain will not be effective. On the other hand, if the content ratio of the abrasive grain exceeds 90 percent in volume, strength for maintaining the abrasive grain declines and it cannot be used as the polishing tool because an amount of the bonding material for the abrasive grain is too low.

By using this polishing tool, it is possible to have the excellent quality with the high efficiency.

Moreover, the producing method of the polishing tool for this invention has a process for producing the secondary particles by the cohesion of a large number of the primary particles; a process for producing the abrasive grain consisting of the porous particle material in which the particles with the cutting edges are produced by bonding together the primary particles with heat treatment at a temperature sufficient to form necks at bonding points between the primary particles and the secondary particles, and many of the primary particles used as cutting edges form gaps between connection points around the secondary particles and bond to each other.

By using the producing method of the polishing tool, it is possible to produce easily a long operating life polishing tool, which can polish extremely effectively while maintaining excellent quality.

Moreover, for the process of fixing the abrasive grain on the backing, it is possible to produce a polishing tool, which satisfies a demanded heat resistance, strength and so on, by using more than one kind of binders selected among resin, ceramic, and metal. It is also possible to improve adhesiveness with the binder by a modification treatment for the surface of the abrasive grain, which is used for this process.

A fixing method includes applying a mixture consisting of such as the binder and the abrasive grain to the backing by using for example wire-bar-coater, gravure-coater, reverse-roll-coater, knife-coater, and so on.

Moreover, in the process of fixing the abrasive grain, which is produced by the producing method of this polishing tool to the backing, it is possible to produce the long operating life polishing tool by fixing the abrasive grain on the backing with a reinforcing material.

It is possible to use inorganic fiber such as metal powder, carbon fiber, glass fiber, and so on, organic fiber such as polyacrylonitrile, and so on, and metal fiber, and so on as the reinforcing material.

When using the fiber, it is possible to use an appropriate length of the fiber such as chopped fiber, milled fiber, and so on depending on need. It is also possible to improve the adhesiveness with the binder by the modification treatment for the surface of these fibers. It is also possible to use various types of whisker beside identified above as the reinforcement material.

Moreover, it is possible to produce the lapping film and the polishing pad by using the producing method of this polishing tool.

The producing method of the polishing tool related to the present invention has the process for producing the secondary particles by the cohesion of a large number of the primary particles; the process for producing the abrasive grain consisting of the porous particle material in which the secondary particles are produced by bonding together the primary particles with heat treatment to form a neck at bonding points between the primary particles and the growing secondary particles. The process involves a large number of the primary particles which form gaps between each other as they bond together to form the secondary particles. In other words, the primary particles stick out from the newly formed secondary particle an provide grinding surfaces. Another aspect of the process for producing an abrasive grain mixture material involves mixing or agitating the binder bonding the abrasive grain and the abrasive grain and a process for producing a grinding wheel by forming the abrasive grain mixture material.

In accordance with the producing method of the grinding wheel, the grinding wheel, which can polish extremely effectively while maintaining excellent quality.

At this point, it is possible to use more than one kind of materials among resin, ceramic, and metal as the binder. Moreover, after using the ceramic precursor, it is possible to produce the ceramic by the heat treatment.

By using the producing method of the grinding wheel, it is possible to improve rigidity and stiffness by adding the reinforcing materials in the process of producing the abrasive grain mixture material produced by mixing or agitating the bonding material, which bonds the abrasive grain and the abrasive grain. Moreover, the long operating life grinding wheel can be produced.

Moreover, the reinforcement material includes organic fiber, inorganic fiber, and metal fiber is used, and it is possible to use an appropriate length of the fiber such as a chopped fiber, a milled fiber, and so on depending on need.

It is also possible to improve the adhesiveness with the binder by the modification treatment of the surface for these fibers. It is also possible to use various types of whisker as the reinforcing material.

Moreover, it is possible to improve the adhesiveness with the binder by the modification treatment of surface for these reinforcement materials.

The polishing tool of the present invention can be attached to the polishing apparatus.

This polishing apparatus has high polishing efficiency, high quality of polishing, and long operating life for the polishing tool, which can reduce the time of changing the polishing tool. It is possible for the polishing tool to have the high processing efficiency, the high processing quality, and the long operating life.

DETAILED DESCRIPTION OF THE PREFERRED EMBODIMENTS

Figure 1:
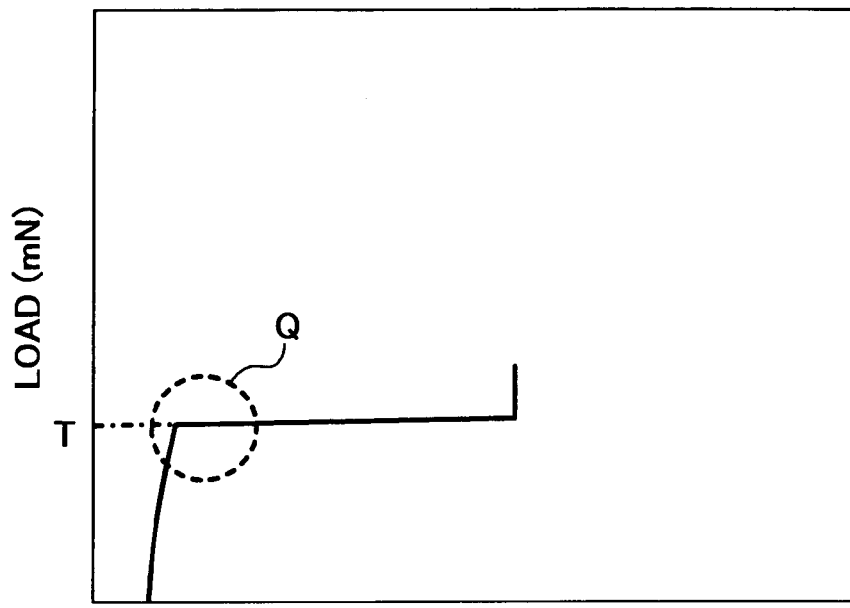
FIG. 1 is a graph showing a relationship between a load of a strength test of compression failure for an abrasive grain and a displacement of pressure.

An abrasive grain according to the present invention consists of a porous particle material. The porous particle material consists of a large number of primary particles which bond together to form secondary particles, but stick out from the secondary particle to form gaps between each other. The primary particles bond to each other via neck-shaped bonds. A large number of the secondary particles for the cutting edges (for grinding) are produced by agglomerating primary particles into secondary particles with heat treatment at a temperature sufficient to form neck-shaped bonds at bonding points among the primary particles. The secondary particles are formed by cohesion of a large number of the primary particles.

The abrasive grain of the present invention is different from a traditional agglomerative abrasive grain in which the fine primary particles were simply agglutinated to form the secondly particles as mentioned in the references. The abrasive grain of the present invention maintains a structure of the porous particle material in which a large number of the secondary particles used for the cutting edges (and grinding) contain gaps which are spaces between primary particles bonded together.

According to the abrasive grain of the present invention, strength of its bonding is stronger compared with strength of its bonding among the primary particles in the traditional grain because necks made of the particle material are formed at the bonding points. The necks are formed by bonding the primary particles with heat treatment to form secondary particles. As a result, it is possible for the abrasive grain of the present invention to use for a long processing time with maintaining the polishing efficiency and the polishing quality.

The particles with cutting edges, in one non-limiting embodiment of the present invention, are particles formed from primary particles bonded together to form secondary particles. The bonding occurs by cohering the primary particles via heat treatment. At least one part of the secondary particles functions as the cutting edges for a work piece when using it for the polishing and grinding.

Moreover, after the heat treatment for growing the secondary particles, the secondary particles are not only grown by a movement of a substances, which builds the particles, but also the bonding parts of among the primary particles becomes thicker by the movement of the substances, which forms the particles, then becomes a smooth curved surface without a discontinuity. That is, after the heat treatment is conducted as growing the primary particles; it becomes so called a "neck", which is necked as a hyperboloid of one sheet (hand drum shape).

"2.3 Mechanism of Substantial Movement and Model of sinter" in "Technical collection of ceramic material" issued from Industrial Technical Center, Ltd, (issue of S54, April 10, No. 1) describes in detail about growing the primary particles and forming the "neck" by movement of the substance at the heat treatment.

The abrasive grain of the present invention does not include a binder because it is bonded by means of the substances composing the particles for the cutting edges among the particles for the cutting edges.

As a result, new cutting edges are automatically projected on the processing surfaces.

Therefore, it is possible to solve a problem that the amount of the projection from the binder becomes insufficient when forming the abrasive grain by using the binder.

Moreover, by using the abrasive grain of the present intervention it is possible to solve problems such as occurrence of defects, and so on for the processing quality including crushing, clogging, and generation of scratch by residue of the binder, adhesion of the waste to the binder, and so on.

However, when forming the secondary particles by cohering a large number of the primary particles, it is possible to use binder, which is dissolved completely by the heat treatment such as an oxygenation, a decomposition, an evaporation, or the like, and for example, binder consisting of an organic material. When using these kinds of binder, it is possible to solve the problem as mentioned above because the binder does not remain when using the abrasive grain.

The strength of bonding the particles for the cutting edges is increased by forming of the necks among the particles at the bonding points. As a result, combined with growing the particles itself, it is possible to produce an abrasive grain at a high processing efficiency rate, the high quality of the processing, and long processing life.

For materials composing the primary particles of the present invention, it is appropriate to use a hard inorganic material including a characteristic that the substances composing the particles are moved and grown by the heat treatment, and can be adopted as the abrasive grain (can be used as the abrasive grain). These substances include silica, ceria, cubic nitriding boron (cBN), alumina, silicon carbide, zirconium oxide, and so on. It is desirable to use the primary particles in which an average diameter of the particles is smaller than 5 µm.

The secondary particles of the present invention are a body of cohesion consisting of a large number of fine primary particles. A method for producing these secondary particles by the cohesion a large number of fine primary particles each other includes a splay drier (Generally, from size of 1 µm to 300 µm of the secondary particles can be produced. When a granulometry is not displayed sharply, a classification process is carried out), a sol-gel method, a freeze-dry method, a solvent dry method, and so on, to which the solvent is used together.

There is another method, which uses a thermal decomposition and a solid-phase reaction. Moreover, as a method for forming from gas, it is possible to use evaporation and cohesion, vapor-phase decomposition, other gas phase reactions, and so on.

The primary particles in the secondary particles are grown by the heat treatment for the secondary particles, which are produced by these methods.

The heat treatment of the present invention is conducted under the condition (temperature and time) of growing the primary particles into the secondary particles, which are formed by the cohesion a large number of fine primary particles.

The condition of the heat treatment is chosen appropriately by the substance, which composes the primary particles. Generally, the temperature is chosen under the condition that the heat treatment can be finished within 10 minutes to several hours. If the time of the heat treatment is too long, it becomes hard to control the particles, and the particles are sintered such as the abrasive grain made of normal ceramic. Even though the particles with the cutting edges are not sintered, the situation is similar to being sintered essentially because the secondary particles become too big. In this case, the effects of the present invention cannot be achieved.

We have conducted examinations of the heat treatment in advance based on several different temperatures and times, and then we have examined a structure of inside the particles after the heat treatment by an electron microscope and so on, and then we have found out the condition that the bonding part among the particles for the cutting edges become the smooth curved surface without the discontinuity.

In other words, we have found out a condition that the primary particles become the hyperboloid of one sheet as a proof of growing the primary particles, and it is a condition of a range, which becomes so called a "neck". It is also the condition of the range maintaining the porous materials in which a large number of secondary particles contain gaps between the primary particles bonded to each other which make up the secondary particle.

These temperatures and times are different based on the materials, but in case of the hard inorganic materials as explained above, the temperature is about from 500 to 1600° C., and the time is from several minutes to 24 hours. In this case, it is possible to conduct the heat treatment with pressurizing.

However, when the particles for the cutting edges, which compose the abrasive grain becomes too big by growing, it has the possibility that the effects of the present invention can not be achieved because of off balance. Therefore, it is desirable that the heat treatment is conducted by the condition in which the average particle diameter of particles for the cutting edges within smaller than 5 μm of the abrasive grain.

Moreover, it is preferable to conduct the heat treatment under the condition that the strength of compression failure for producing the abrasive grain is more than 1 MPa and less than 500 MPa or the pores specific surface area is more than the 18000 $cm^2/cm^3$ and less than 700000 $cm^2/cm^3$.

In accordance with the abrasive grain produced by this condition, it is possible to polish the high processing surface quality more effectively together with controlling the wear of the abrasive grain.

It is also possible to use the polishing tool comprising this abrasive grain for longer time. Moreover, it is possible to save time for changing the polishing tool, and also lower the cost, which is required to change the polishing tool.

TESTING EXAMPLE

Concrete testing examples about the abrasive grain of the present invention is explained as follows.

However, the present invention is not only limited for these testing examples, it is possible to implement in various ways within the range in which the testing example does not deviate from the essential feature of the present invention.

Moreover the average particle diameter is measured by a dry system using Laser Diffraction made of Horiba, Ltd. and Scattering Granulometry Measuring Device LA-920, and the particle diameter of the abrasive grain at 50 percent of frequency accumulation is decided as the average particle diameter (normally called median diameter).

A test for the strength of compression failure is also carried out by Micro Compression Testing Machine, MCTM500PC made of Shimdzu Corporation based on the report of Hiramatu, Oka, and Kiyama (Japan Mining Industry Magazine 81,1024 (1956)).

The secondary particles are compressed by using a flat indentator under the test conditions of the test load from 10 to 1000 mN, load speed 0.446 mN/sec, and then the strength in which the secondary particles are destroyed by compression was measured. FIG. 1 shows a relationship between a compression displacement at this point and a load as a model at this point.

The strength of compression failure, T reads the load value at the curved line bending part Q inside the dotted line circle, and then calculated by this value.

On the other hand an evaluation of a surface roughness for a processing surface was conducted by using Form Talysurf S4C made of Taylor-Hobson Ltd.

Moreover, the fine pores specific surface area of the present invention is multiplied value of BET specific surface, which was measured by absorption and de-sorption of BET one point method for relative pressure 0.3 of nitrogen gas and density of a material composing the abrasive grain.

Testing Example 1

Figure 2:
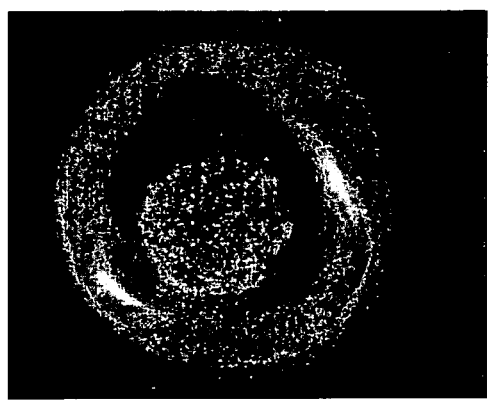
FIG. 2 is a photograph of a scanning electron microscope (SEM) showing a whole image of second particle.
Figure 3:
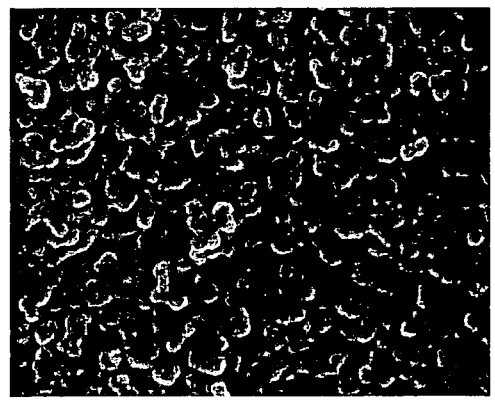
FIG. 3 is a photograph of a scanning electron microscope (SEM) showing second particles, which are enlarged partly before a heat treatment.

Slurry was produced by adding water (water system binder for example mixture of polyvinyl alcohol water is available to use) into ultra fine zirconium oxide ($ZrO_2$) powder as the primary particles consisting of the particle diameter from 50 nm to 60 nm. After the spraying the slurry by the spray dryer, secondary particles α, which have 50 μm of the average particle diameter, are produced. The strength of compression failure for these secondary particles α were 0.47 MPa. FIG. 2 and FIG. 3 shows a whole scanning electro microscope (SEM) photograph of the secondary particles and partly enlarged the scanning electro microscope (SEM) photograph.

The heat treatment for these secondary particles a was conducted by use of an electronic furnace. The polyvinyl alcohol, which was used as the binder when forming the secondary particles, is eliminated completely by this heat treatment.

In accordance with previously examined condition, the temperature of the heat treatment and the time of the heat treatment were adjusted to become the inside particles within the porous particle material, which works as the particles for the cutting edges when using as the abrasive grain, smaller than 5 μm.

Figure 4:
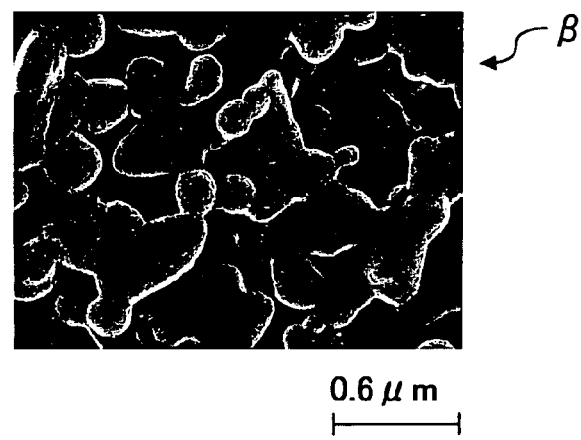
FIG. 4 is a photograph of a scanning electron microscope (SEM) showing abrasive grains, which are enlarged partly after a heat treatment.

FIG. 4 shows a partly enlarged SEM photograph (the same magnification as FIG. 3) about an example of the porous particle material (abrasive grain β) consisting of this zirconium oxide in which the heat treatment was conducted by appropriate condition.

According to FIG. 4, the porous particle material (abrasive grain β), which works as the particles for the cutting edges when using it as the abrasive grain, is obviously growing bigger than the primary particles shown in the FIG. 3, and the bond among the particles become the necked hyperboloid of one sheet so called the "neck".

It is also possible to identify that a large number of secondary particles contain gaps between primary particles bonded to each other. Moreover, when the heat treatment is conducted, if the time of the heat treatment is too long or the temperature of the heat treatment is too high, the primary particles are completely sintered, and then become almost solid.

The abrasive grain β related to the present invention, which was produced by the strength of compression failure 92.6 MP and the average particle diameter 50 μm, is mixed with liquid urethane resin to become the volume ratio of the particles is 35 percent of its volume.

Moreover, a mixture was produced by mixture and agitation of the abrasive grain and resin for ten minutes with an agitator after adjusting solution viscosity by adding the solvent. The agitation was conducted by a room temperature and 50 rpm of its revolution speed in which the speed does not destroy the abrasive grain.

The mixture was applied on the backing (PET film of about 75 μm thickness) by using the wire-bar-coater. Thereafter, it was dried for one hour in a constant temperature tank, which keeps the temperature of 60° C., and then a lapping film A as the polishing tool was produced.

Maximum thickness of a produced application layer (a part of comprising the abrasive grain) becomes almost same as maximum diameter of the abrasive grain related to the present invention having the granulometry (By using the solvent, it becomes easier to thin the thickness of the binder's layer).

The lapping film A produced by this method was attached to a lapping platen, then after processing (processing condition: 60 rpm of platen revolution speed, 46 kPa of processing pressure) an optics glass disk (borosilicate crown glass (suitable for BK7)), which Ry was adjusted to 2 μm, a mirror surface without a scratch in which the maximum height for roughness Ry is less than 30 nm (nanometer) was produced in two minutes.

Figure 5:
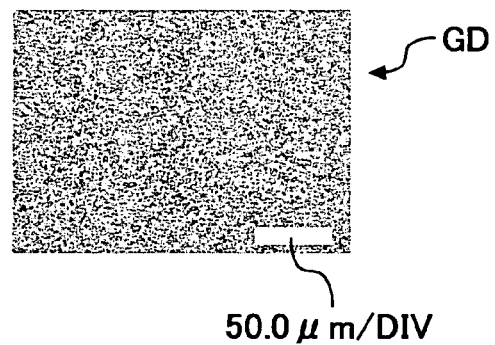
FIG. 5 is an enlarged photograph of a glass disk surface before polishing of embodiment 1
Figure 6:
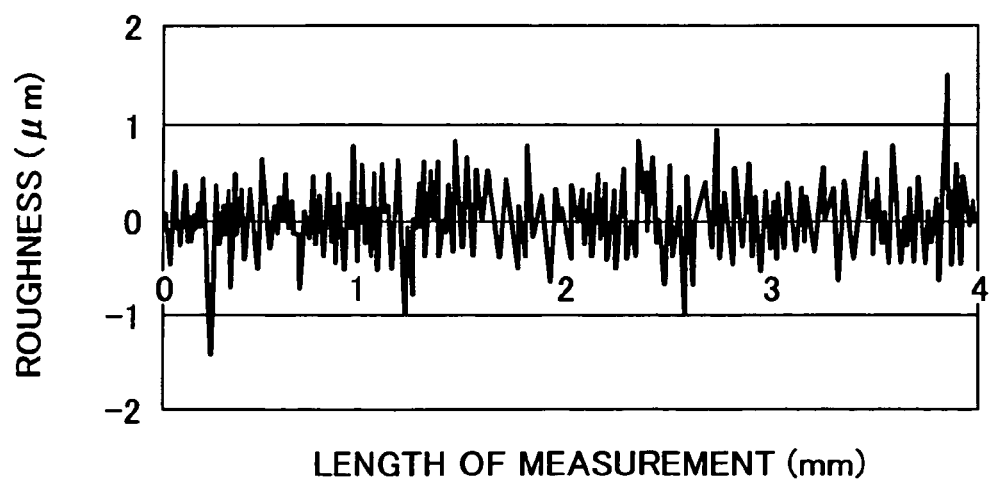
FIG. 6 is a chart showing a measurement result of a surface roughness for the glass disk surface before a grinding of embodiment 1.
Figure 7:
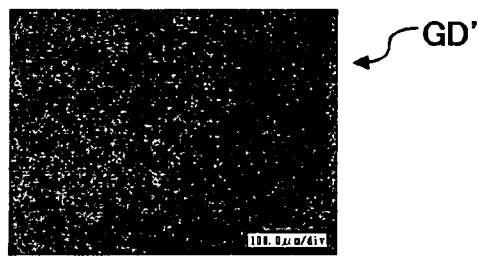
FIG. 7 is an enlarged photograph of the glass disk surface after polishing grinding in embodiment 1.
Figure 8:
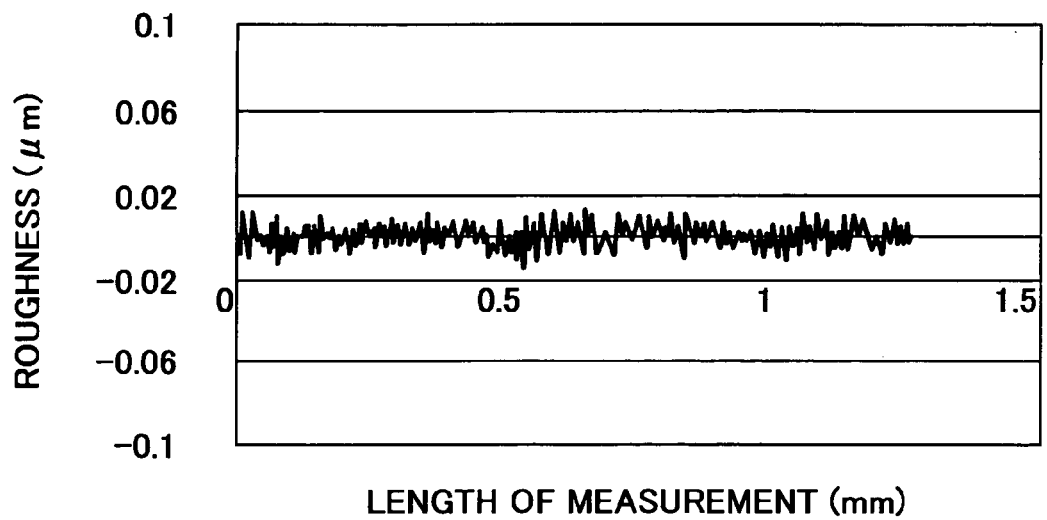
FIG. 8 is a chart showing a measurement result of the surface roughness of the glass disk surface after polishing in embodiment 1.

After that processing 20 sheets of the same glass disks under the same condition were processed continuously, the processing efficiency and the processing surface roughness were barely deteriorated. At this point, FIG. 5 shows enlarged surface photograph GD of the glass disk before the processing. FIG. 6 shows the measurement result (chart) for the surface roughness of the glass disk. Moreover, FIG. 7 shows the enlarged surface photograph GD' (the same magnification as FIG. 5) after processing, and FIG. 8 shows measurement result for the surface roughness.

Figure 9:
FIG. 9 is an enlarged photograph showing a condition of abrasive grains on a surface of a lapping film after using as polishing in embodiment 1.

It is possible to see that irregularity, which was remained before the processing, was almost eliminated after the processing, and it becomes the mirror surface. The condition of the wear of the abrasive grain on the lapping film A after processing 10 sheets of glass disks was examined. FIG. 9 shows a condition of a surface A'.

According to FIG. 9, it is possible to see that the abrasive grain does not have big damage and fallout from the backing by progressing the wear gradually along with progress of the processing because the bonding strength among the particles for the cutting edges are appropriate.

Abrasive grain γ and δ of comparative examples 1, 2 were produced by the same method, which produced the abrasive grain β by using the secondary particles α of the testing example 1. But the heat treatment condition was changed.

The strength of compression failure for the abrasive grain γ was 0.6 MPa, and the pores specific surface area was 1000000 cm$^2$/cm$^3$. The strength of compression failure of the abrasive grain δ was 613 MPa, and the pores specific surface area was 3000 cm$^2$/cm$^3$. The average particle diameter of these abrasive grain γ and δ were 50 μm for the both abrasive grains.

Examination of each abrasive grain γ and δ, which was conducted by the scanning electron microscope, did not show a formation of the "neck" at 0.6 MPa of the strength of compression failure of the abrasive grain δ. In other words, it was found that the enough heat treatment was not conducted, so that the primary particles were not growing.

On the other hand, 613 MPa of the strength of compression failure for abrasive grain δ did not have the structure that a large number of fine particles for the cutting edges contain gaps between primary particles bonded to each other and it became almost absolute sintered compact.

A lapping film B (the strength of compression failure of abrasive grain γ: 0.6 MPa, comparative example 1) and a lapping film C (the strength of compression failure strength of abrasive grain δ: 613 MPa, comparative example 2) were produced under the same method as producing the lapping film A by using each of these two abrasive grains γ and δ.

These lapping films B and C were attached to the lapping platens respectively, and then processed BK7 optics glass disk in which the maximum height for the surface roughness Ry becomes 2 μm. For the lapping film B, the processing was conducted for 20 minutes, but the maximum height for the surface roughness Ry only achieved to 1.275 μm.

When conducting the same processing test by using the lapping film produced by using the second abrasive grain α (strength of compression failure of 0.47 MPa) in which the heat treatment was not done, the processing efficiency was lower than the result of the lapping film B, and the processing surface before polishing could not be improved.

Figure 10:
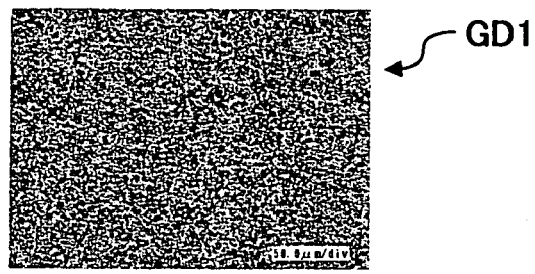
FIG. 10 is an enlarged photograph of a glass disk surface before polishing in comparative example 1.
Figure 11:
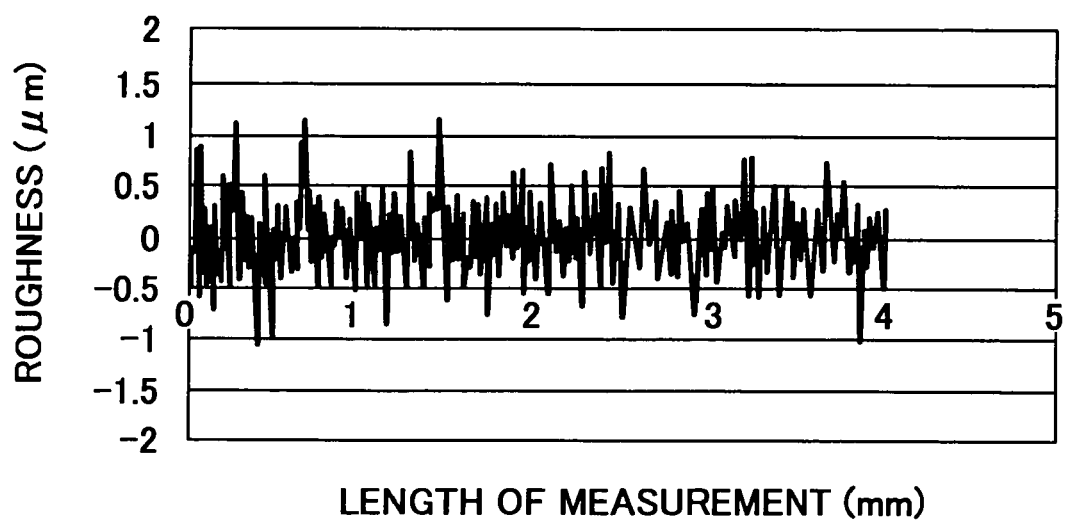
FIG. 11 is a chart showing a measurement result of a surface roughness of the glass disk surface before polishing in comparative example 1.
Figure 12:
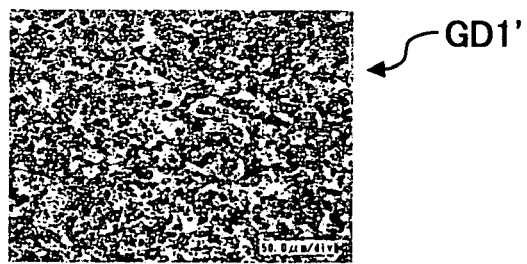
FIG. 12 is an enlarged photograph of the glass disk surface after polishing in comparative example 1.
Figure 13:
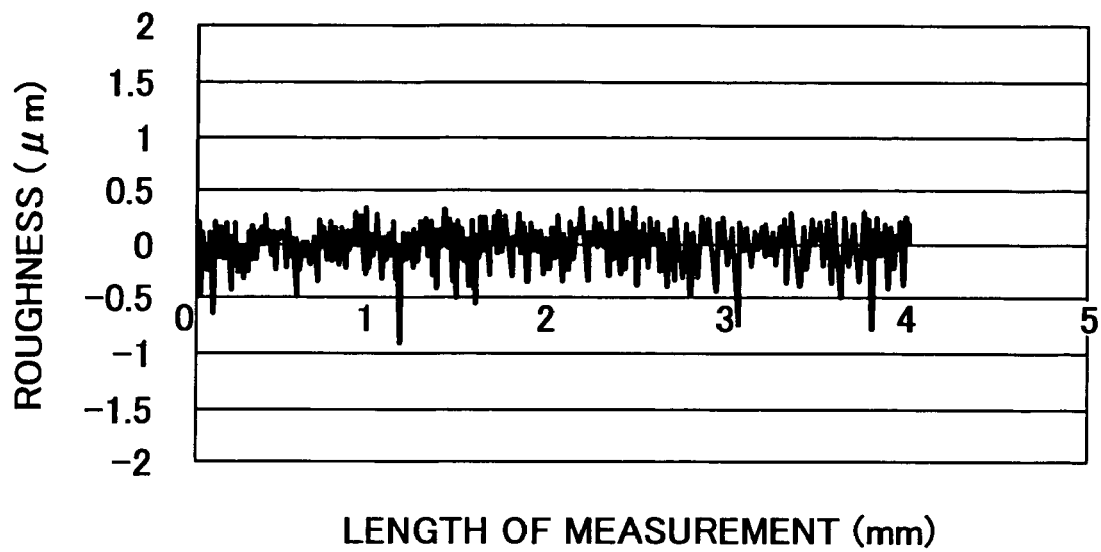
FIG. 13 is a chart showing a measurement result of the surface roughness of the glass disk surface after polishing in comparative example 1.

FIG. 10 shows an enlarged photograph GD 1 of the surface of the glass disk before the processing. FIG. 11 shows the measurement result of its surface roughness. Moreover, FIG. 12 shows an enlarged photograph GD 1' (expansion magnification is same as FIG. 10) of the surface after 20 minutes processing, and FIG. 13 shows the measurement result of its surface roughness.

Figure 14:
FIG. 14 is an enlarged photograph showing a condition of abrasive grains on a surface of a lapping film after using as polishing in comparative example 1.

FIG. 14 shows the condition of the abrasive grain on lapping film B' after using as the processing.

These results show that even though the surface roughness of the glass disk was improved a little by polishing for 20 minutes using the lapping film B, but the pre-finished surface of the glass disk was not removed completely because the hard abrasion of abrasive grain is generated (Reference of FIG. 14).

Figure 15:
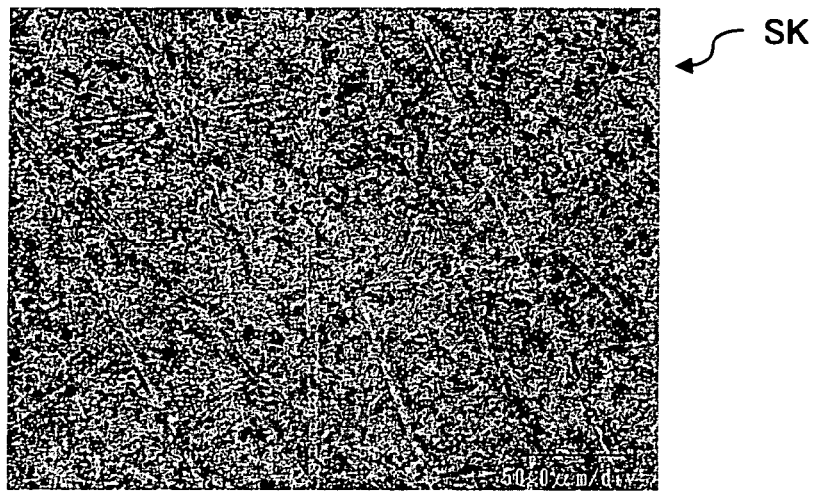
FIG. 15 is an enlarged photograph of a glass disk surface after polishing in comparative example 2.

On the other hand, when using the lapping film C, a big scratch was generated newly by processing the surface of the glass disk surface because of using the abrasive grain, which became the absolute sintered compact bonding completely among the primary particles. In other words, the maximum height for surface roughness Ry was rather deteriorated as 2.7228 μm (Scratch SK can be seen in the surface expanded picture of FIG. 15).

Figure 16:
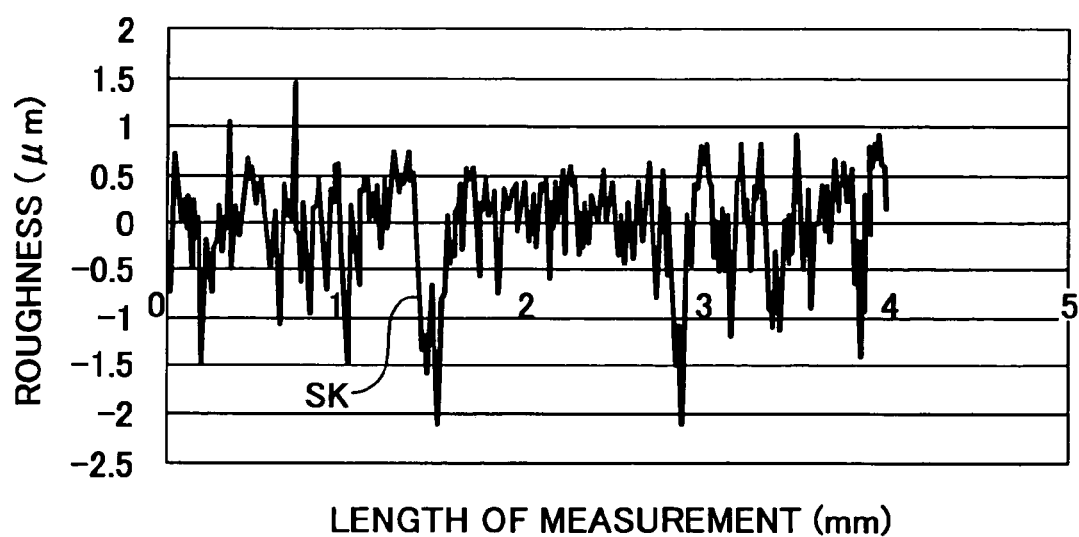
FIG. 16 is a chart showing a measurement result of a surface roughness of the glass disk surface after polishing in comparative example 2.

An appearance of the scratch SK is recognized from the measurement result of the surface roughness (FIG. 16) on the processing surface after polishing. On the other hand, the abrasive grain was hardly worn away, and the planarization of the edges for the abrasive grain was not seen by the observation of the microscope.

Figure 17:
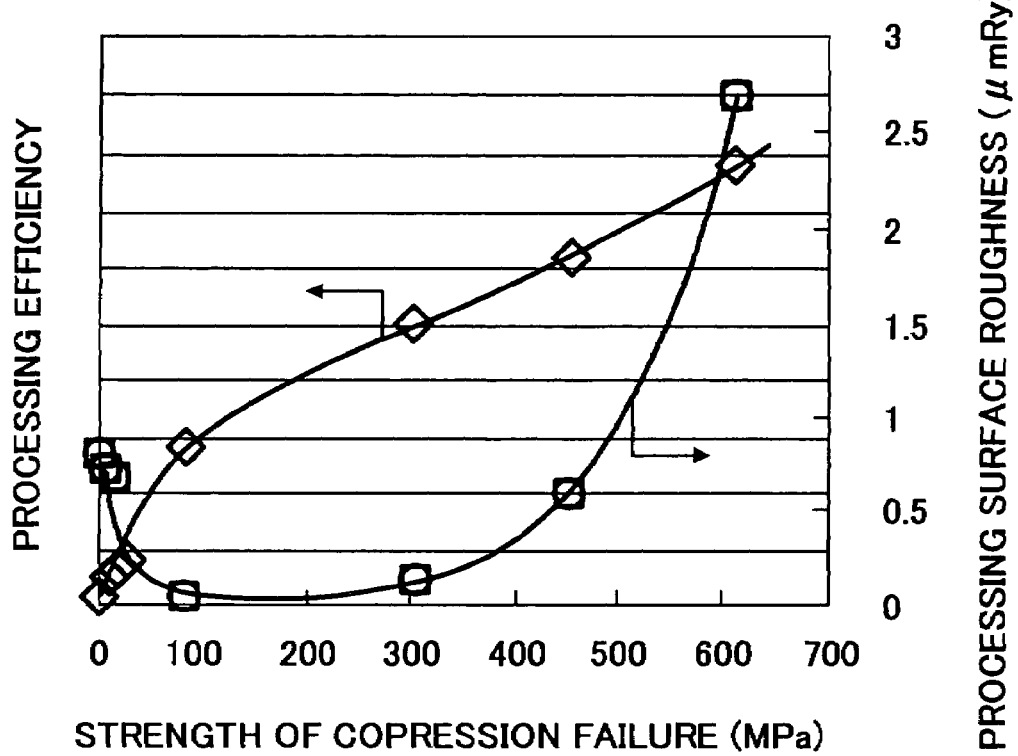
FIG. 17 is a graph examining a relationship among strength of compression failure for an abrasive grain, a surface roughness and a processing efficiency for a lapping film, which comprises various types of the strength of compression failure for the abrasive grain.

Lapping films comprising the abrasive grains, which have several kinds of the strength of compression failure, are produced in the same way. FIG. 17 shows a result of relationship among the strength of compression failure, the surface roughness (sign: □), and the processing efficiency (sign: ◇).

In FIG. 17, a vertical axis of processing efficiency relatively shows amount of polishing per unit time, and the processing efficiency becomes higher as reaching the upper part over the middle part of the graph.

According to FIG. 17, it is shown that if the strength of compression failure is too small (the strength of compression failure: less than 1 MPa), in other words, if the bonding strength of the particles for the cutting edges are too weak, the surface roughness can not be improved much because the processing efficiency is low, and a destruction of the abrasive grain is proceeded by processing pressure, so that the processing surface before the polishing can not be eliminated completely.

Meanwhile, if the strength of compression failure is too strong, for example, in case of the almost absolute sintered compact (the strength of compression failure: 613 MPa), the processing efficiency becomes extremely high. However, on the other hand, the quality of the processing surface is highly deteriorated. In this way, only the abrasive grain related to the present invention, which comprises the appropriate bonding strength of the particles for the cutting blade edges, could achieve the high quality of the processing surface (mirror surface) very effectively. At that time, it was found that the wear of the abrasive grain is controlled, and the polishing tool can operate longer.

Figure 18:
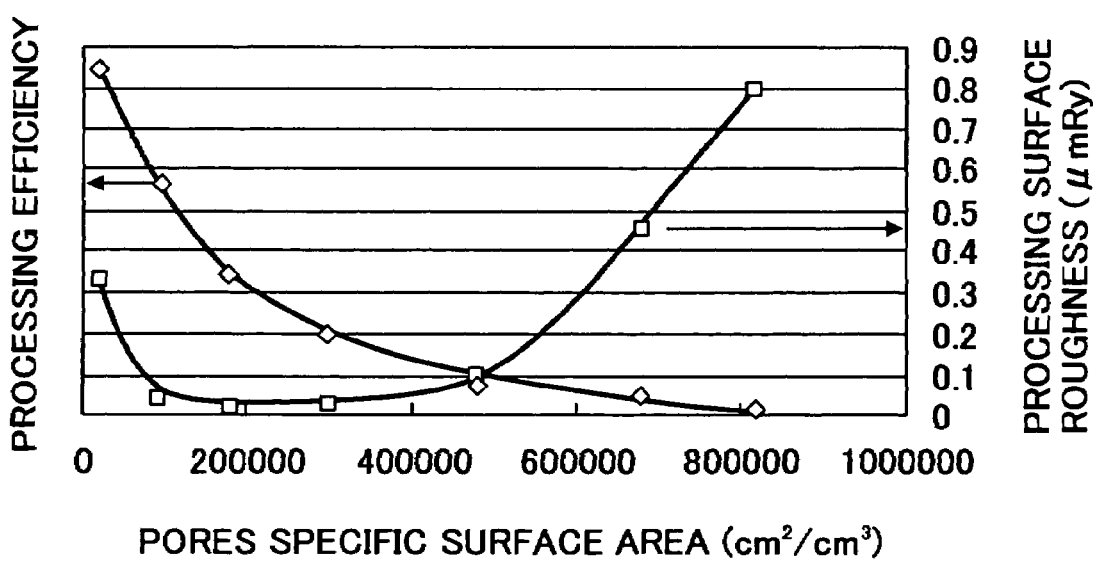
FIG. 18 is a graph examining a relationship among a pores specific surface area, a surface roughness, and a processing efficiency for a grinding film, which comprises various types of strength of compression failure for an abrasive grain.

About the abrasive grains comprising the various strength of compression failure for the abrasive grain shown in FIG. 17, FIG. 18 shows a relationship between the fine pores specific surface area, which is a parameter showing inside structure of the abrasive grain, and the processing efficiency. At this time, the fine pores specific surface area is different from a normal specific surface area (unit is [cm²/g] or [m²/g] and so on). In other words, the fine pores specific surface area is a parameter, which shows a difference of the inside structure prominently, because the fine pores specific surface area excludes an affect based on a difference of a specific gravity of a material.

In FIG. 18, the processing efficiency of the vertical axis relatively shows the amount of polishing per unit time, and the processing efficiency goes higher as reaching upper part over middle part of the graph.

According to FIG. 18, it is shown that if the fine pores specific surface area is too big (the pores specific surface area: over 700000 cm²/cm³), in other words, if the bonding strength among the particles for the cutting edges is too weak, the processing efficiency is lowered.

The surface roughness cannot be improved much also because the destruction of the abrasive grain by the processing pressure is progressed and the pre-finished processing surface is not removed completely.

Meanwhile, if the fine pores specific surface area is too small, the structure that a large number of fine particles for the cutting edges contain gaps between primary particles bonded to each other, is lost.

For example, when using the almost absolute sintered compact (the pores specific surface area: less than 5000 cm²/cm³), the processing efficiency is extremely improved. However, on the other hand, when using the almost absolute sintered compact, the quality of processing surface is highly deteriorated.

In this way, the only abrasive grain related to the present invention, which comprises the bonding strength among the particles for the cutting edges and the specific structure, could achieve the high quality of the processing surface (mirror surface) very effectively. At this point, it was found that the wear of the abrasive grain is controlled, and the polishing tool can operate longer.

Testing Example 2

Silica abrasive grain, which consists of colloidal silica and diameter of the primary particle (average particle diameter of 50 nm) is cohered to become the average particle diameter 30 μm by the sol-gel method. Then the produced silica powder is dried and secondary particles ε were produced by eliminating water and organic solvent, which are contained in the fine pores.

For the produced secondary particles ε, which were produced by this method, an observation of the scanning electron microscope was conducted after conducted the heat treatment under various kinds of conditions.

From these particles, the abrasive grain ζ related to the present invention is produced. This abrasive grain ζ is the porous particle material in which a large number of fine particles for the cutting edges contain gaps between primary particles bonded to each other, and also the particles for the cutting edges are formed by growing the primary particles with the heat treatment.

The strength of compression failure of this abrasive ζ was 124.2 MPa, and size of the particles for the cutting edges was 1.2 μm.

Polyurethane resin paint was mixed with the produced abrasive grain ζ in which the volume ratio becomes 35 percent of its volume and copper powder of the average particles diameter of 3 μm. After that, the mixture was produced by mixture and agitation of particles and resin for 15 minutes by the agitator at the rotation speed of 60 rpm.

At this point, it is possible to add blowing agent to form independent bubble depending on need.

The mixture was poured into a circular form metal mold (450 mmΦ), then it was hardened with the heat treatment at 120° C. for 10 hours, and then the polishing pad was produced. The produced polishing pad was attached to the surface platen after cutting it into a specified size, and then polishing processing was conducted for a silicon wafer which was grinded by a grinding wheel of about #2000 in advance.

As a result, the mirror surface, which does not have any scratch and lower than 20 nm of the maximum height for the surface roughness Ry, was produced in 10 minutes of the processing. Even though polishing of 20 sheets of the silicon wafers were conducted continuously; processing efficiency and processing surface roughness were not deteriorated.

Figure 19:
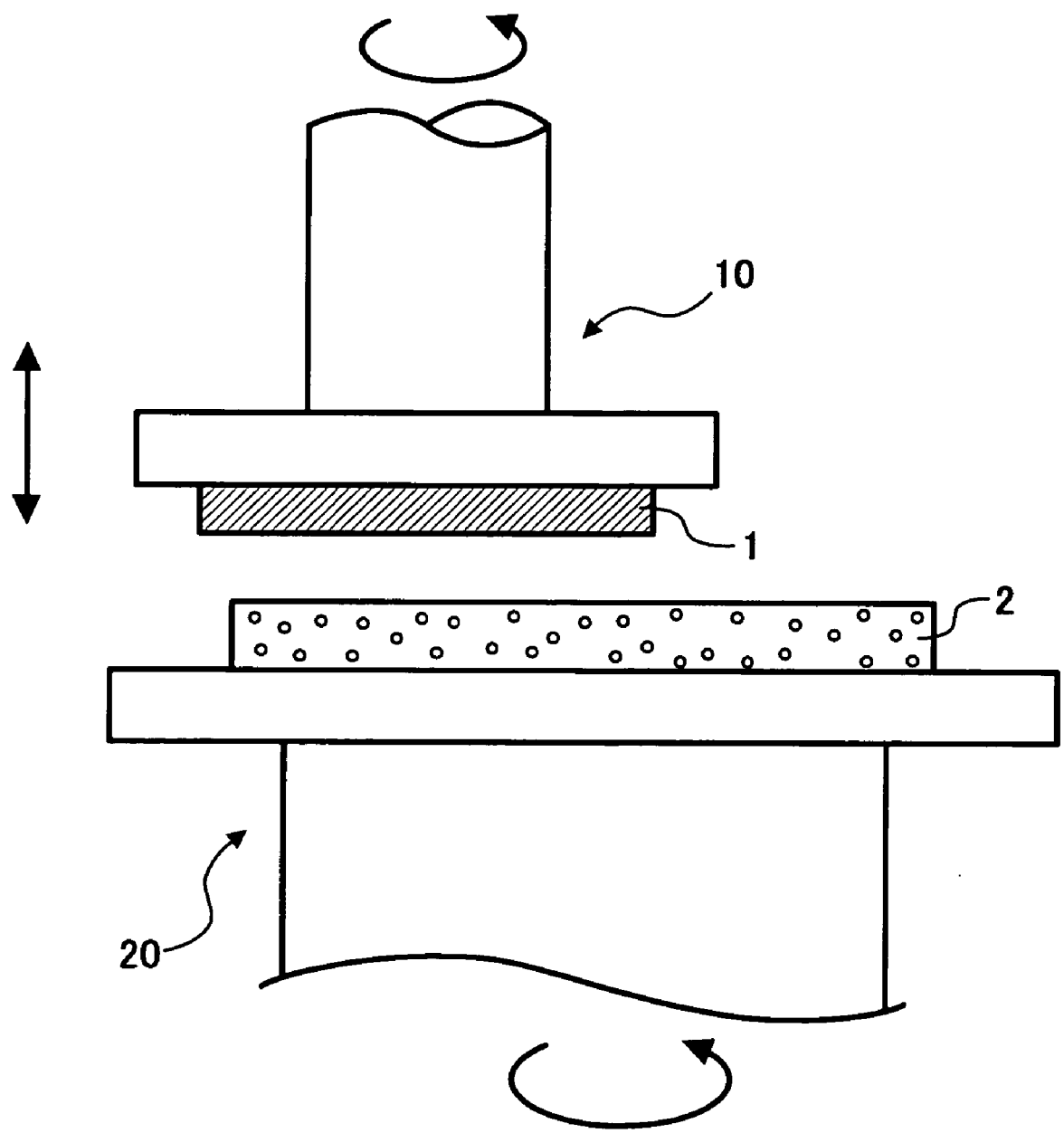
FIG. 19 is a view showing an example of a polishing apparatus for processing silicon installing a grinding wheel, which comprises an abrasive grain based on the present invention.

At this point, FIG. 19 shows an example of attaching the polishing pad, which is related to the present invention used for the testing example 2, to the polishing apparatus for processing silicon as a model.

For the FIG. 19, the sign 1 is a work piece, a silicon wafer. The silicon wafer is mounted on a rotation part 10. The silicon wafer is rotated by the rotation of this rotation part 10. An undersurface of the silicon wafer is also polished by contacting to the polishing pad 2 related to the present invention, which was mounted on a platen 20 (lapping film can be mounted instead of the polishing pad) in accordance with upward and downward movement of the rotation part 10. Moreover, the whole undersurface of the silicon wafer 1 is polished equally because the surface platen 20 rotates.

Testing Example 3

Using silica abrasive grain as the polishing pad was considered. The strength of compression failure of the silica abrasive grain was 18.5 MPa and size of particles for the cutting edges was 0.2 μm, which was produced by the heat treatment under different condition from testing example 2 for secondly particles ε.

Polishing pad was produced by use of the silica abrasive grain under the same condition as testing example 2, and a processing test of a silicon wafer by using the grinding cloth was conducted as well. As a result, a mirror surface, which has lower than 20 nm of maximum height for surface roughness Ry, was produced in 15 minutes of a processing time. However, after the processing was conducted continuously, the processing efficiency was declined gradually. When processing 5 sheets of the silicon wafer, 30 percent of the processing efficiency was declined compared to the beginning of the processing, although the processing surface roughness is the same level, and then it became impossible to process after the 15$^{th}$ sheets of the silicon wafer.

Testing Example 4

Phenol aldehyde resin was mixed with the abrasive grain related to the present invention comprising the average particle diameter of 30 μm and the strength of compression failure of 124.2 MPa as the same as used in the testing example 2 in which the volume ratio becomes 45 percent of its volume at last and nickel powder (reinforcement material) of the average particle diameter of 3 μm becomes 15 percent of its volume. After that, the mixture was produced by mixture and agitation the powder and resin for 15 minutes by the agitator at the rotation speed of 60 rpm.

The mixture was poured into the metal mold, and a grinding wheel was produced by a hardening treatment for about 5 hours at the temperature of 150° C. with pressuring.

After the produced grinding wheel was attached to vertical axis of Infeed Grinding Machine, and grinded a lapping finished silicon wafer, mirror surface, which has lower than 30 nm of the maximum height for the surface roughness Ry, was produced in one minutes of a processing time. After grinding for 20 sheets of silicon wafer continuously, grinding burn was not generated, and deterioration of the grinding efficiency and surface roughness were not identified.

Testing Example 5

A polishing processing test for a silicon wafer was conducted under the condition, which used the abrasive grain related to the present invention comprising the same strength for compression failure 18.5 MPa as used in the testing example 3, and beside that it was used the same conditions as the testing example 4 to manufacture the grinding wheel.

As a result, a mirror surface, which has lower than 30 nm of the maximum height for the surface Ry, was produced in one minute of processing time. However, after processing was conducted continuously, the grinding burn was generated on the surface of the silicon wafer when $10^{th}$ sheets of silicon wafer were processed.

As explaining above, the abrasive grain of the present invention consists of the porous particle material. The porous material is composed of a large number of fine particles for the cutting edges, which contain gaps between primary particles bonded to each other. The particles for the cutting edges are produced by growing the primary particles in the secondary particles, which were formed by the cohesion of a large number of the primary particles, with the heat treatment at the temperature of forming the necks at the bonding point among the primary particles. Therefore, when using as the abrasive grain, at least the part, which is contacted to the gap of the particles for the cutting edges on the processing surface, woks as the cutting edges.

The particles for the cutting edges are also projected newly on the processing surface automatically while the part comprising the particles for the cutting edges is lost by the wear of the particles for the cutting edges. Moreover, the bonding strength among the particles for the cutting edges is optimized, so that it is possible to maintain the excellent quality and have the stable processing for the long processing time very effectively.

The polishing tool of the present invention also has the high processing efficiency, the high quality of processing, and the long operating life.

The polishing apparatus of the present invention also has the high polishing efficiency, the high quality of polishing, and the long operating life for the polishing tool.

According to the producing method of the abrasive grain of the present invention, when processing of polishing, the cutting edges are always generated voluntarily for the abrasive grain. Therefore, it makes easy to eliminate the waste of the polishing, and it is certainly possible to produce the abrasive grain, which can polish very effectively with maintaining the excellent quality, stably with the high productivity.

According to the producing method of the polishing tool of the present invention, it is also possible to produce the long operating life polishing tool, which can polish very effectively with maintaining excellent quality.

According to the producing method of the grinding wheel of the present invention, it is possible to produce the grinding wheel, which can grind very effectively with maintaining the excellent quality.

What is clamed is:

1. An abrasive grain, comprising:
a plurality of primary particles; and
a secondary particle comprising a plurality of primary particles,
wherein in the secondary particle:
the plurality of primary particles are bonded through neck portions between a portion of at least one of the primary particles and another of the primary particles,
the plurality of primary particles form grinding surfaces configured to perform grinding, and
each of the neck portions has a hyperboloid of one sheet shape, comprises a comprising materials from the adjacent primary particles.

2. The abrasive grain according to claim 1, wherein a surface of the secondary particles functions as a grinding surface to perform grinding, and
the portion of the plurality of primary particles, which are bonded to form the secondary particle, is configured to break away at the neck portion.

3. The abrasive grain according to claim 1, wherein the secondary particle has a strength of compression failure which is more than 1 MPa and less than 500 MPa.

4. The abrasive grain according to claim 1, wherein the secondary particle has pores specific surface area which is more than 18000 cm$^2$/cm$^3$ and less than 700000 cm$^2$/cm$^3$.

5. The abrasive grain according to claim 1, wherein an average particle diameter of said primary particles is smaller than 5 μm.

6. The abrasive grain according to claim 1, wherein a binder is not included to bond the primary particles.

7. The abrasive grain according to claim 1, wherein the secondary particle has a strength of compression failure which is more than 20 MPa and less than 300 MPa.

8. The abrasive grain according to claim 1, wherein the secondary particle has a pores specific surface area which is more than 100000 cm$^2$/cm$^3$ and less than 300000 cm$^2$/cm$^3$.

* * * * *